United States Patent [19]

Emmerson

[11] 4,196,333

[45] Apr. 1, 1980

[54] WELDING WIRE AND APPARATUS FOR DISPENSING THE SAME

[76] Inventor: John O. Emmerson, Magnatech, The DSD Co., Bradley Pk., E. Granby, Conn. 06026

[21] Appl. No.: 865,514

[22] Filed: Dec. 29, 1977

[51] Int. Cl.² .......................... B23K 9/12; B23K 31/6; B65H 49/18
[52] U.S. Cl. ................................. 219/60 A; 228/41; 242/129; 219/137.2; 219/145.1
[58] Field of Search ............ 242/54 R, 129; 226/187, 226/188; 219/60 A, 137.2, 145.1, 137.44; 228/41, 244

[56] References Cited

U.S. PATENT DOCUMENTS

| | | | |
|---|---|---|---|
| 2,806,128 | 9/1957 | Muller | 219/145.1 |
| 3,016,451 | 1/1962 | Cornell, Jr. | 226/187 |
| 3,143,633 | 8/1964 | Wadleigh | 219/137.2 |
| 3,151,819 | 10/1964 | Hodgdon | 242/54 R |
| 3,286,947 | 11/1966 | Erickson | 242/128 |
| 3,387,759 | 6/1968 | Stedman | 226/188 |
| 3,718,798 | 2/1973 | Randolph et al. | 219/60 A |
| 3,777,103 | 12/1973 | White et al. | 219/60 A |
| 3,831,879 | 8/1974 | Miller et al. | 219/129 |

Primary Examiner—Bruce A. Reynolds
Assistant Examiner—Keith E. George
Attorney, Agent, or Firm—Prutzman, Kalb, Chilton & Alix

[57] ABSTRACT

An orbital welding apparatus for butt welding tubular pipes includes a non-consumable electrode for establishing an electrical arc and means for storing and dispensing consumable weld wire through an aiming conduit. The weld wire is a solid monofilament wire helically coiled into a plurality of closely spaced convolution having a hollow core to provide minimum bending stiffness and a low constant spring rate in the bending mode so that it can negotiate sharper bends without permanent deformation. It is stored around a spool which is rotatably mounted in a non-rotatable magazine having a fixed block at one end. The fixed block supports a friction member formed by a plurality of axially projecting spaced loops of resilient filaments which engage the smooth end of the spool to provide a low uniform frictional drag balancing the low spring force of the weld wire as it is uncoiled from the spool and is fed to the aiming conduit by a pair of powered feed rollers having a resilient outer periphery to grip the wire.

11 Claims, 4 Drawing Figures

WELDING WIRE AND APPARATUS FOR DISPENSING THE SAME

BRIEF SUMMARY OF THE INVENTION

This invention relates to electric arc welding apparatus and, more particularly, to the means for storing and feeding welding wire to the weld puddle of the apparatus.

In the process of electric arc welding, it is essential that the welding wire emerge from the aiming nozzle along the precise centerline of the aiming nozzle even though it is coiled for storage and even though it must negotiate sharp turns in travelling from storage to the aiming nozzle. Any wobble of the free end of the wire as it emerges from the aiming nozzle, either laterally or vertically, will affect the precision of the welding process. Moreover, the welding wire must enter the weld puddle at a uniform rate.

In addition, the wire must be capable of being fed from storage to the aiming nozzle without excess friction despite the necessity to push the wire around sharp turns, and the inertia load imposed on the feed drive must be uniform and light to avoid both the stretching of the wire and an uneven rate of entry of the welding wire into the weld puddle. Finally, in many applications, such as the orbital welding of closely spaced pipes, the welding apparatus including its wire storage, propulsion, and aiming system must fit into a low profile space envelope.

Conventional solid welding wire coiled around a spool develops a permanent bend due to its mode of storage and the requirement that it negotiate tight bends prior to arriving at the aiming nozzle. Such bends in the welding wire can cause wobble from the precise path intended by the aiming nozzle, thereby adversely affecting the quality of weld produced. This problem is aggravated if conventional solid welding wire is stored and fed to the aiming nozzle so that it rotates about its longitudinal axis.

Additionally, where the space above the workpiece is quite limited, the aiming conduit may follow a tortuous path having several small radius bends of 90° or more. These conduit bends may result in the bending of conventional solid welding wire beyond its elastic limit and will also increase the frictional load on the wire, particularly where the wire is pushed through the aiming nozzle. Since limited space makes it desirable to use a motor of small size, meeting such an increased load is difficult, if not impossible.

This invention provides an improved welding wire construction coupled with an improved storage and feeding mechanism which minimizes the power required to push the wire to an aiming nozzle uniformly and accurately, and which requires a minimum amount of space thus overcoming the problems of prior wire storage and feeding mechanisms.

It is a principal object of the invention to provide new and improved means for storing and dispensing welding wire for use in electric arc welding. Included in this object is the provision of a welding wire storage arrangement which is particularly suited for use in welding apparatus where a low profile is essential. Further included in this object is the storage and dispensing of the welding wire in a form which facilitates transit of the wire around small radius bends in a guide conduit, while additionally allowing the wire to be accurately directed toward the weld zone as it emerges from the aiming nozzle.

It is a further object of the invention to provide a welding wire storage and dispensing arrangement which imposes a low and uniform load on the welding wire feed mechanism, thereby enabling a reduction in its size.

Other objects will be in part obvious and in part pointed out more in detail hereinafter.

A better understanding of the invention will be obtained from the following detailed description and the accompanying drawings of an illustrative application of the invention.

DESCRIPTION OF THE PREFERRED EMBODIMENT

Figure 2:
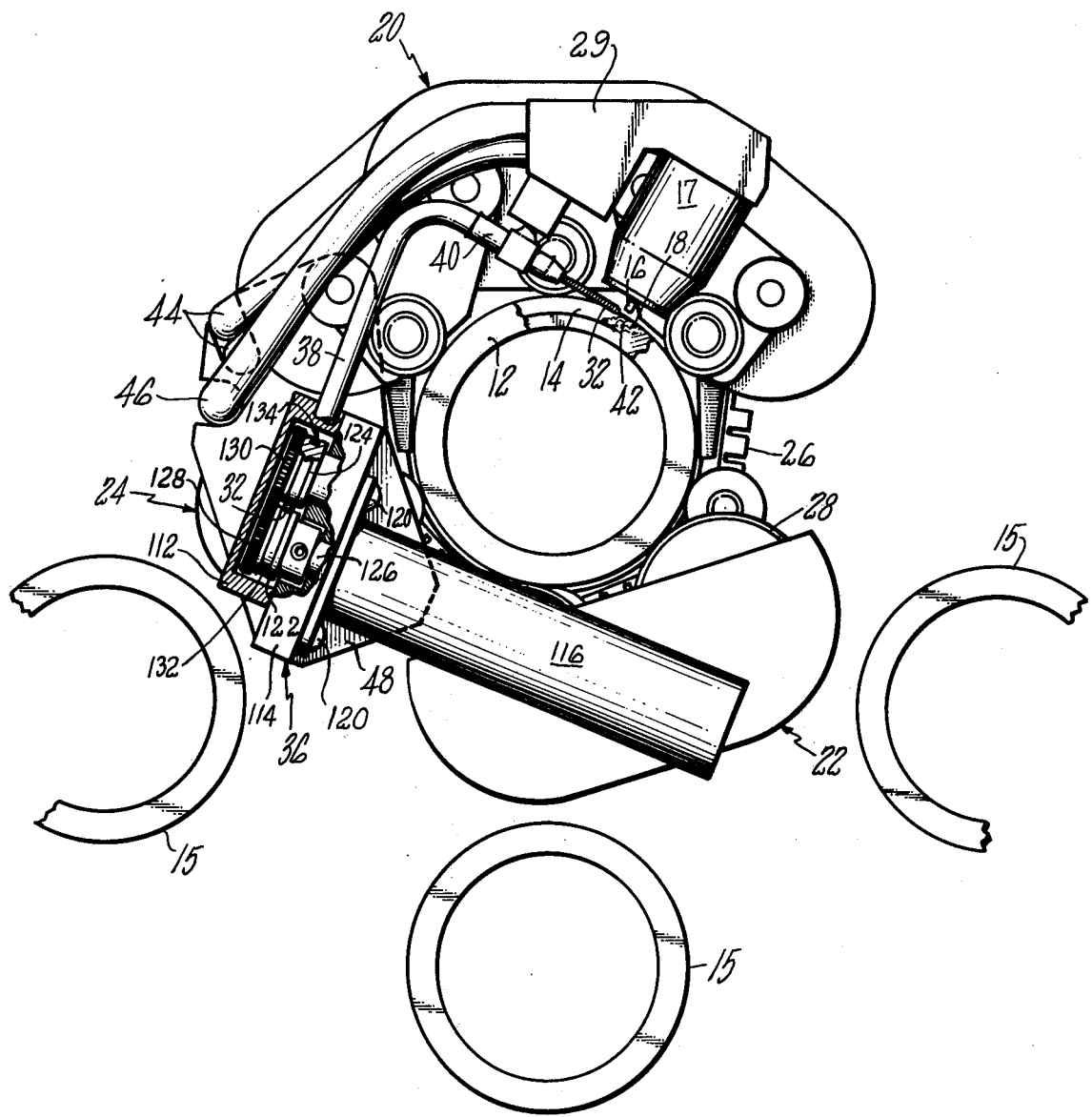
FIG. 2 is an elevational front end view, partly broken away and partly in section, of the orbital arc welding apparatus of FIG. 1.

Referring to the drawings in greater detail wherein like reference numerals indicate like parts, the present invention is illustrated in connection with an orbital pipe or tube welder operatively mounted on one of a pair of end abutting tubular members, such as pipes 12 and 14, for orbiting a torch 17 including a non-consumable tungsten electrode 16 closely adjacent the annular abutment or weld line 18 between pipes 12 and 14 to effect an annular butt weld. The pipes 12, 14 may be of small outside diameter, say, 1½ inches or less, and a limited radial clearance of, say, 1¾ inch, may exist between the abutting pipes 12, 14 and the adjacent pipes 15 as illustrated in FIG. 2. The pipes 12, 14 are held in abutting engagement by an suitable means (not shown) which may either be associated with the welder or separate therefrom.

The welder, as illustrated, comprises a three section articulated control module 20 which mounts the torch 17, a filler or welding wire storage and drive module 24 pivotally connected to the control module 20 and a tractor module 22 pivotally connected to the filler wire module 24, such that the modules 20, 22 and 24 are connected to one another for joined orbital movement about the pipe 14 on which they are mounted, the modules being relatively articulated for adapting the welder to pipes of different diameters.

As shown, a powered roller 28 on the tractor module 22 engages a neoprene propulsion belt 26 which in turn grips the periphery of the pipe 14 such that the welder moves along the belt 26 in an orbital path around the pipe. The tractor module 22 and the control module 20 are connected by the neoprene propulsion belt 26 to maintain the welder in engagement with the surface of the pipe 14.

The torch 17 is shown as being supported axially forward of the control module 20 by support 29 for positioning the electrode 16 over the weld line 18. It will be understood that the torch 17 is conventionally movable relative to control module 20 for adjusting its position relative to the pipe 14.

Filler or welding wire 32 of a predetermined welding alloy is stored in an elongated tubular magazine or cassette 34. The welding wire 32 is propelled, via a wire drive subassembly 36 from the magazine 34 through a breech 30, a flexible aiming conduit 38, and a rigid aiming nozzle 40 to the weld puddle 42 formed along the weld line 18 by the heat of the arc from torch electrode 16. The aiming nozzle 40 is also mounted by the bracket 29 affixing the torch 17 to the control module 20 and is adjustably positioned for the precise aiming of the emerging filler wire 32 toward the weld puddle 42. Cooling fluid and electrical power are supplied to torch electrode 16 by hoses 44 and 46 connected to respective cooling fluid and power sources (not shown) and supported by mounting bracket 48.

In accordance with one aspect of the invention, the welding wire 32 is formed from solid monofilament or single strand welding wire having a filament diameter of, say, 0.01–0.02 inch, formed into a plurality of closely wound convolutions to form a helical coil having a diameter of, say, 0.08 inch. Reference herein to filler wire is intended to refer to this close, helically coiled configuration of welding wire 32.

A single length of the filler wire 32 is stored within the tubular magazine or cassette 34 in a plurality of layers of coil 50 formed of a helically wound filler wire of several layers of convolutions of the same diameter in each layer.

The magazine or cassette 34 is preferably of a clear plastic outer tube 35 having a breech block 53 at one end and a retaining block 57 at the other. The retaining block 57 is fixed within the rear end of tube 35 as by a pair of pins 59 received in radial holes 61 of the tube 35. The breech block 53 and the retaining block 57 are each provided with central apertures 66, 68 for journaling the ends of the spindle of a spool 70 for the filler wire. Secured against the shoulders 72, 74 at the ends of spool 70 are a pair of disks 76, 78 which serve to axially restrain the helically-wound coil 50. The breech block 53 is provided with a stepped central bore 80 which mounts an axial biasing means shown as comprising two pairs of spring washers 82 which are nested in a stepped spring seat 84 within bore 80. Stepped seat 84 telescopically receives a second stepped spring seat 86 which abuts disk 76 of spool 70 with the spring seats 84, 86 spanning the spring washers 82.

At the opposite end of the cassette 34 is a friction disk 90 which is fixed to retaining block 57. Friction disk 90 is formed of a plurality of axially extending resilient loops which project toward and frictionally engage disk 78. The resilient loops are preferably made of nylon and are spaced from each other to provide a good long-wearing bearing surface. A tape having the desired construction is sold under the trademark VELCRO for use in zippers. A set screw 91 is adjusted to apply a light preload on the spring washers 82 to set the desired breakaway torque required to cause the spool 70 to overcome the friction between disk 90 and disk 78.

By virtue of the friction disk construction, the frictional force applied to disk 78 by friction disk 90 may be uniformly and accurately set since the individual loops may become shorter due to axial compression and/or skew sideways. In this regard, the clearances between the individual nylon loops will accommodate any debris which may be present.

The breech block 53 is provided with a central passage 92 from which the filler wire may emerge from the cassette as it is uncoiled.

Figure 4:
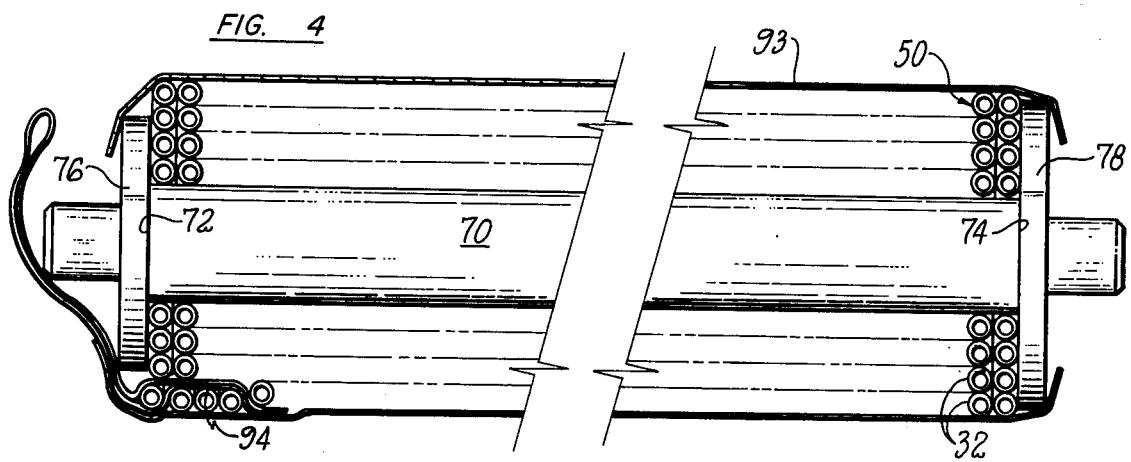
FIG. 4 is a replacement spool for the storage and feeding arrangement of FIG. 3.

Preferably, a spool having filler wire pre-wound thereon as shown in FIG. 4 is provided with a shrink tube cover 93 for storage surrounding the convolutions to prevent air containing contaminants from contacting the filler wire during storage. As shown, the end convolutions of the weld wire are interlocked by the locking tab 94 so that after the shrink tube is removed from the spool and loaded into a cassette, the tab will be exposed through an axial groove 95 in breech block 53 so that it may be pulled out to free the convolutions of the coil 50.

Figure 1:
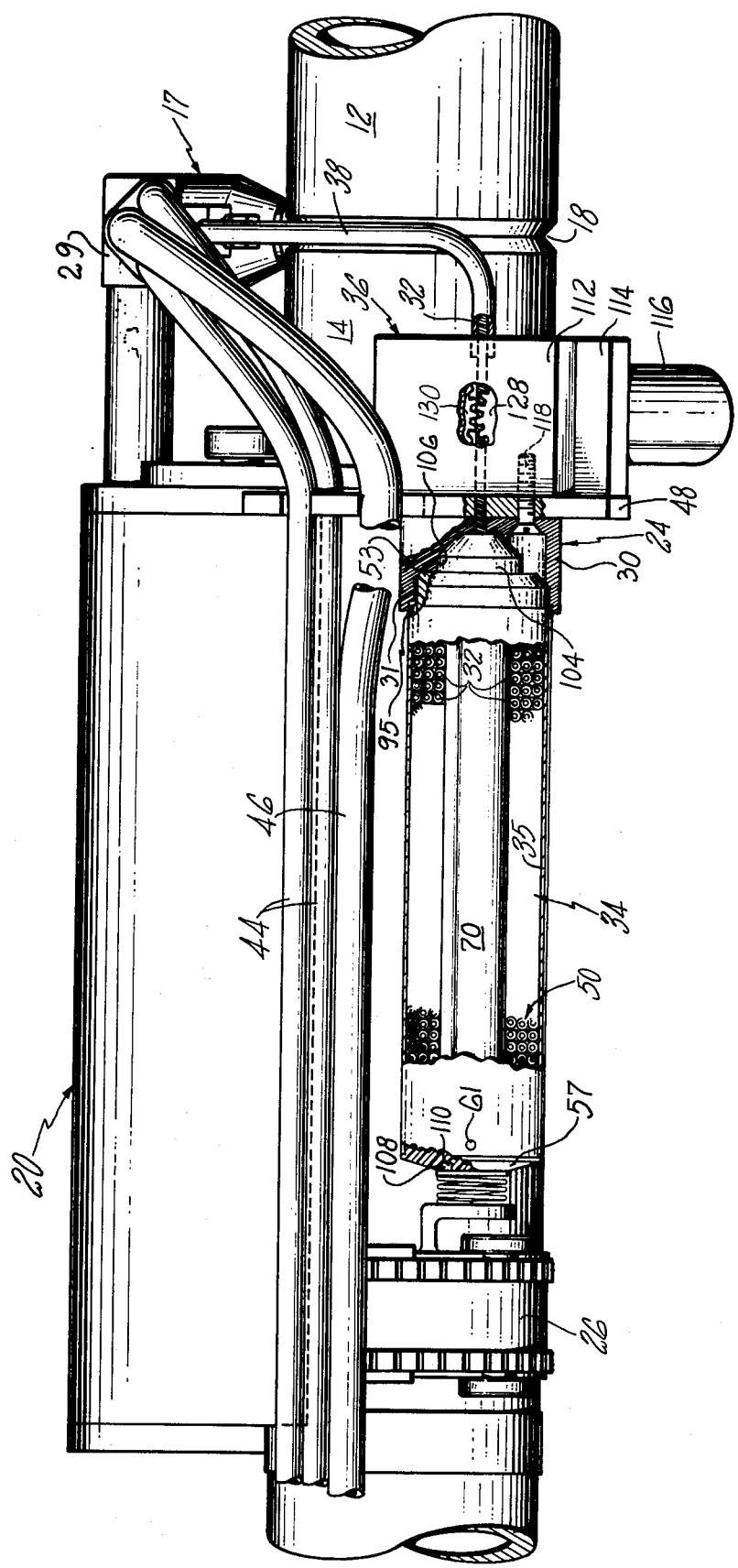
FIG. 1 is a side elevational view, partly broken away and partly in section, of an orbital arc welding apparatus mounted on a tubular workpiece and incorporating the novel welding wire storage and feeding arrangement of the invention.
Figure 3:
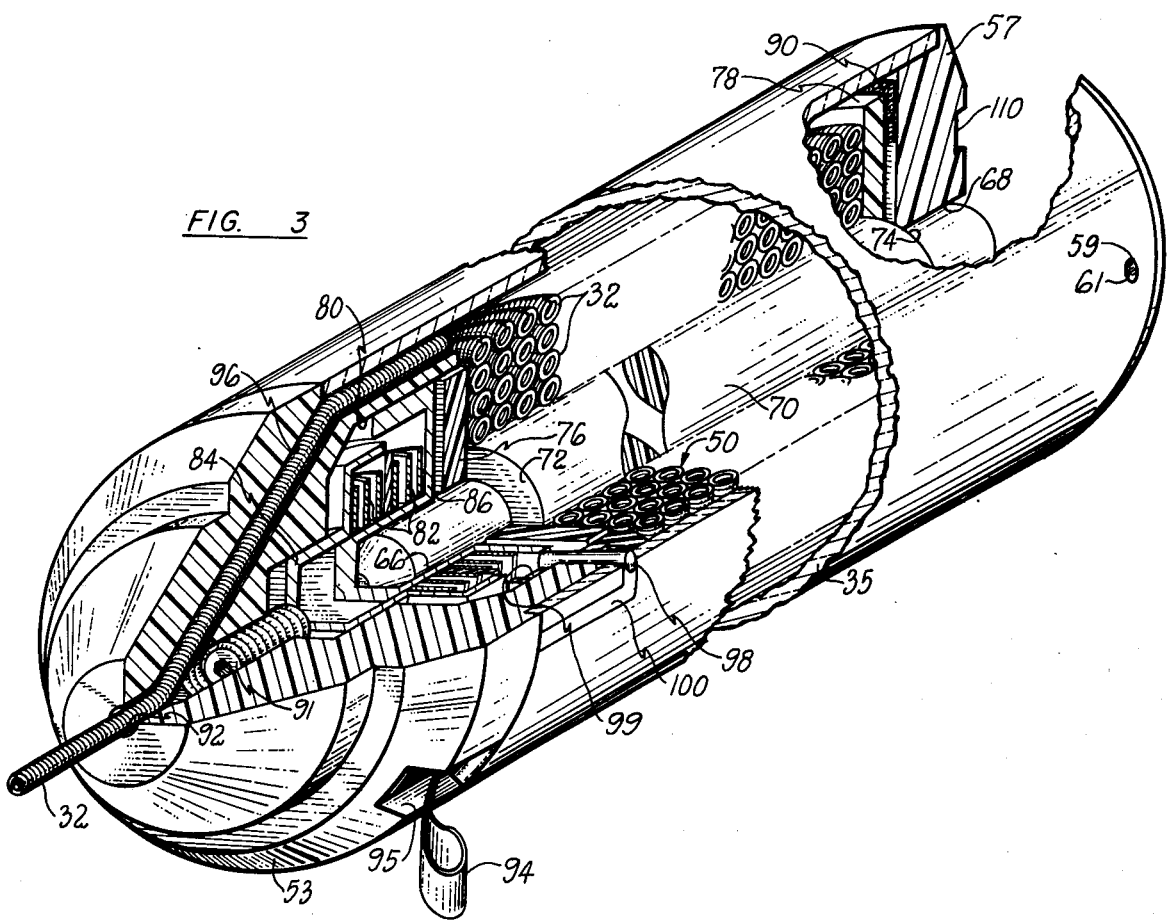
FIG. 3 is an enlarged perspective view, partly broken away and partly in section, showing the welding wire storage and feeding arrangement of this invention.

In assembling a pre-wound spool into the cassette 34 the breech block is disassembled from the tube 35 and a spent spool removed. A new spool is installed and the end of the filler wire is fed through the passage 96 of the breech block so as to extend through the aperture 92 and thereafter the breech block is reassembled on the tube 35. The breech block is provided with a pair of pins 98 (only one of which is shown) which pass through bayonet slots 100 in the tube 35. The breech block is then rotated slightly to capture the pins in the bayonet slots. The locking tab 94 which extends axially through groove 95 is then removed to complete the assembly of a new spool in the cassette. At this time the cassette 94 may be assembled in the welding machine by placing the breech block 53 in the breech 30. If desired, a lug 31 on breech 30 may be provided to mate with groove 95 to rotationally orient the cassette. The annular recess 104 of the breech block is engaged by mating anular shoulder 106 of the breech to axially and radially align the breech and the breech block. The cassette may then be shifted to its aligned position shown in FIG. 1 and a spring biased detent 108 placed in recess 110 of the retaining block 57 to secure the cassette. It will be noted from FIG. 3 that the inner ends of pins 98 extend into closed end slots 99 of spring seat 86 to maintain the breech block in assembled condition while permitting the preload of spring washers 82.

The wire drive subassembly 36 comprises a pair of opposed drive blocks 112, 114, and a small diameter motor 116 of generally cylindrical shape, are mounted by a mounting bracket 48 as by a mounting screw 118, the motor 116 being mounted on the drive block 114 by screws 120 to present a low profile and to minimize the radial clearance required to accommodate it. Drive blocks 112, 114 are releasably connected to one another by fasteners, not shown.

The drive block 112 provides a recess for housing a pair of opposed propulsion or feed rollers 122, 124 which are powered by connection with the motor shaft 126 which extends through an opening in drive block 114. The feed roller 122 is directly fixed to motor shaft 126 and spur gears 128, 130 on rollers 122, 124 respectively are engaged with one another to power both rollers and thereby reduce the drag due to the clamping of the welding wire 32 which would occur if one roller was not powered. Annular urethane tires 132, 134 may be mounted on the respective feed rollers 122, 124 to lightly grip the filler wire 32 to push the wire forward through the aiming conduit 38.

The motor 116 and the feed roller 122, 124 may be of dimunitive size and power capacity because the axial force required to feed the filler wire 32 is minimal due to the extremely low friction of the wire in the conduit resulting from the use of filler wire in the form of helically-wound coil which has a very low bending moment and is able to readily negotiate the curves of conduit 38. Moreover, while the welding wire 32 must follow a tortuous path, including sharp turns of, say, ⅛ inch diameter, in passing through the aiming conduit 38 due to the limited space available for the conduit, the extreme flexibility of the welding wire 32 makes it possible for the wire to negotiate tight small bends in the aiming conduit 38 with little friction even though it is pushed through the conduit. In addition, the wire may negotiate the tight small radius bends without being permanently deformed so as to cause wobble either vertically or laterally from the centerline of the aiming nozzle 40 as it emerges therefrom.

If desired, the diameter of a few convolutions of filler wire 32 at either the leading or trailing end of coil 50 may be reduced such that it may be "screwed into" the complementary normal diameter end of another similar coil 50 to accommodate the serial connection of the lead end of a full, stored coil of filler wire with the trailing end of a nearly exhausted preceding coil. This type of connection does not change the diameter of the filler wire 32 passing through the feed rollers 122, 124 and aiming conduit 38 and eliminates the need to discard residual lengths of filler wire which otherwise are of insufficient length to complete the next weld.

As will be apparent to persons skilled in the art, various modifications, adaptations and variations of the foregoing specific disclosure can be made without departing from the teachings of the present invention.

I claim:

1. Welding wire storing and dispensing apparatus for dispensing the wire through an aiming conduit in response to a small axial driving force, comprising a spool, a solid monofilament welding wire helically coiled into a plurality of convolutions of uniform diameter and having a hollow core to form a filler wire wrapped around the spool, a non-rotatable magazine rotatably mounting said spool and having a retaining block fixed at one end thereof, means on said magazine and said spool comprising a friction surface formed of a plurality of spaced projecting loops of resilient material engageable with a smooth relatively rotatable mating surface, an biasing means for applying a biasing force on said friction surface to establish a constant breakaway torque for rotating said spool.

2. The device of claim 1 including a breech block at the other end of said magazine, said breech block being provided with a central aperture for the exit of the filler wire from the magazine, said breech block further being removably secured to the magazine, and providing means for biasing said spool toward the retaining block, said friction surface being mounted by said retaining block.

3. The device of claim 2 wherein said friction surface is formed by a plurality of axially projecting spaced loops of resilient filaments engageable with an end disk of said spool.

4. The device of claim 3 wherein said axial biasing means includes a pair of spring washers exerting an axial biasing force on the opposite end of said spool.

5. The device of claim 4 wherein said spring washers are nested between a pair of telescoping seat members.

6. The device of claim 4 wherein an adjusting screw is provided to adjust the preload of said spring washers.

7. The device of claim 2 including a pair of powered feed rollers and a breech for mounting said magazine in alignment therewith, said feed rollers gripping the weld wire to push the filler wire through the aiming conduit.

8. The device of claim 7 wherein said feed rollers are respectively provided with resilient means engaging the outer periphery of the convolutions forming the filler wire to positively drive the same.

9. The device of claim 8 wherein both of said feed rollers are powered.

10. The device of claim 9 wherein said feed rollers are mounted to rotate with meshing drive gears to drive both rollers at the same speed.

11. An orbital welding apparatus for butt welding abutting tubular workpiece members along an annular weld line, non-consumable weld electrode means spaced adjacent the weld line and operative for establishing an electrical arc therebetween for establishing a weld puddle at the weld line, means for effecting orbital motion of the electrode means relative to the tubular workpiece members adjacent to the weld line, a non-rotatable storage magazine, an aiming conduit having an aiming nozzle at the end thereof for feeding welding wire from the storage magazine to the weld puddle, feed means to propel the welding wire through the aiming conduit, said welding wire comprising a solid monofilament welding wire helically coiled into a plurality of convolutions of uniform diameter to form a filler wire, and said magazine being an elongated tubular magazine mounted for orbital movement with said electrode and extending substantially parallel to the tubular workpiece members adjacent thereto, a spool rotatably mounted by said storage magazine, said filler wire being helically wound around said spool to form an elongated multi-layered helical coil concentrically within said storage chamber, said tubular magazine having a centrally apertured breech block at one end thereof to provide an exit passage for said filler wire, means on said magazine providing a friction surface formed of a plurality of spaced projecting loops of resilient material engageable with said spool to control the breakaway torque thereof, and a biasing means to set said torque, said breech being mounted in alignment with said feed means which grip said filler wire to push the same through said aiming conduit.

* * * * *